United States Patent
Benning et al.

(10) Patent No.: US 7,042,955 B2
(45) Date of Patent: *May 9, 2006

(54) SPACE TIME SPREADING AND PHASE SWEEP TRANSMIT DIVERSITY

(75) Inventors: Roger David Benning, Long Valley, NJ (US); R. Michael Buehrer, Morristown, NJ (US); Mark H Kraml, Flanders, NJ (US); Paul Anthony Polakos, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 725 days.

This patent is subject to a terminal disclaimer.

(21) Appl. No.: 09/918,391

(22) Filed: Jul. 30, 2001

(65) Prior Publication Data

US 2003/0021352 A1   Jan. 30, 2003

(51) Int. Cl.
*H04B 7/02* (2006.01)
*H04B 7/10* (2006.01)
*H04B 7/216* (2006.01)

(52) U.S. Cl. ............... 375/267; 375/347; 370/342
(58) Field of Classification Search ............ 375/267, 375/130, 146, 295, 347, 346; 455/401, 127, 455/101, 105; 370/342, 335
See application file for complete search history.

(56) References Cited

U.S. PATENT DOCUMENTS

| | | | | |
|---|---|---|---|---|
| 5,584,057 A | * | 12/1996 | Dent ........................ | 455/101 |
| 6,219,374 B1 | * | 4/2001 | Kim et al. ................ | 375/130 |
| 6,535,496 B1 | * | 3/2003 | Odenwalder et al. ...... | 370/335 |
| 6,748,024 B1 | * | 6/2004 | Kuchi et al. .............. | 375/299 |

* cited by examiner

*Primary Examiner*—Khai Tran
(74) *Attorney, Agent, or Firm*—Jimmy Goo

(57) ABSTRACT

Described herein is a method and apparatus for transmission that provides the performance of space time spreading (STS) or orthogonal transmit diversity (OTD) and the backwards compatibility of phase sweep transmit diversity (PSTD) without significantly degrading performance in additive white guassan noise (AWGN) conditions using a transmission architecture that incorporates STS/OTD and a form of phase sweep transmit diversity (PSTD) referred to herein as biased PSTD, which involves transmitting a signal and a frequency swept version of the same signal over diversity antennas at different power levels to reduce the depths of nulls normally seen in AWGN conditions when regular PSTD is utilized.

36 Claims, 3 Drawing Sheets

10

20

SPACE TIME SPREADING AND PHASE SWEEP TRANSMIT DIVERSITY

RELATED APPLICATION

Related subject matter is disclosed in the following applications filed concurrently and assigned to the same assignee hereof: U.S. patent application Ser. No. 09/18392 entitled, "Symmetric Sweep Phase Sweep Transmit Diversity," inventors Roger Benning, R. Michael Buehrer, Paul A. Polakos and Mark Kraml; U.S. patent application Ser. No. 09/918393 entitled, "Biased Phase Sweep Transmit Diversity," inventors Roger Benning, R. Michael Buehrer and Robert Atmaram Soni; and U.S. patent application Ser. No. 09/918086 entitled, "Split Shift Phase Sweep Transmit Diversity," inventors Roger Benning, R. Michael Buehrer, Robert Atmaram Soni and Paul A. Polakos.

BACKGROUND OF THE RELATED ART

Performance of wireless communication systems is directly related to signal strength statistics of received signals. Third generation wireless communication systems utilize transmit diversity techniques for downlink transmissions (i.e., communication link from a base station to a mobile-station) in order to improve received signal strength statistics and, thus, performance. Two such transmit diversity techniques are space time spreading (STS) and phase sweep transmit diversity (PSTD).

FIG. 1 depicts a wireless communication system 10 employing STS. Wireless communication system 10 comprises at least one base station 12 having two antenna elements 14-1 and 14-2, wherein antenna elements 14-1 and 14-2 are spaced far apart for achieving transmit diversity. Base station 12 receives a signal S for transmitting to mobile-station 16. Signal S is alternately divided into signals $s_e$ and $s_o$, wherein signal $s_e$ comprises even data bits and signal $s_o$ comprises odd data bits. Signals $s_e$ and $s_o$ are processed to produce signals $S^{14-1}$ and $S^{14-2}$. Specifically, $s_e$ is multiplied with Walsh code $w_1$ to produce signal $s_e w_1$; a conjugate of signal $s_o$ is multiplied with Walsh code $w_2$ to produce signal $s_o^* w_2$; signal $s_o$ is multiplied with Walsh code $w_1$ to produce $s_o w_1$; and a conjugate of signal $s_e$ is multiplied with Walsh code $w_2$ to produce $s_e^* w_2$. Signal $s_e w_1$ is added to signal $s_o^* w_2$ to produce signal $S^{14-1}$ (i.e., $S^{14-1} = s_e w_1 + s_o^* w_2$) and signal $s_e^* w_2$ is subtracted from signal $s_o w_1$ to produce signal $S^{14-2}$ (i.e., $S^{14-2} = s_o w_1 - s_e^* w_2$). Signals $S^{14-1}$ and $S^{14-2}$ are transmitted at substantially equal or identical power levels over antenna elements 14-1 and 14-2, respectively. For purposes of this application, power levels are "substantially equal" or "identical" when the power levels are within 1% of each other.

Mobile-station 16 receives signal R comprising $\gamma_1(S^{14-2}) + \gamma_2(S^{14-2})$, wherein $\gamma_1$ and $\gamma_2$ are distortion factor coefficients associated with the transmission of signals $S^{14-1}$ and $S^{14-2}$ from antenna elements 14-1 and 14-2 to mobile-station 16, respectively. Distortion factor coefficients $\gamma_1$ and $\gamma_2$ can be estimated using pilot signals, as is well-known in the art. Mobile-station 16 decodes signal R with Walsh codes $w_1$ and $w_2$ to respectively produce outputs:

$$W_1 = \gamma_1 s_e + \gamma_2 s_o \quad \text{equation 1}$$

$$W_2 = \gamma_1 s_o^* - \gamma_2 s_e^* \quad \text{equation 1a}$$

Using the following equations, estimates of signals $s_e$ and $s_o$, i.e., $\hat{s}_e$ and $\hat{s}_o$, may be obtained:

$$\hat{s}_e = \gamma_1^* W_1 - \gamma_2 W_2^* = s_e(|\gamma_1|^2 + |\gamma_2|^2) + \text{noise} \quad \text{equation 2}$$

$$\hat{s}_o = \gamma_2^* W_1 + \gamma_1 W_2^* = s_o(|\gamma_1|^2 + |\gamma_2|^2) + \text{noise}' \quad \text{equation 2a}$$

However, STS is a transmit diversity technique that is not backward compatible from the perspective of the mobile-station. That is, mobile-station 16 is required to have the necessary hardware and/or software to decode signal R. Mobile-stations without such hardware and/or software, such as pre-third generation mobile-stations, would be incapable of decoding signal R.

By contrast, phase sweep transmit diversity (PSTD) is backward compatible from the perspective of the mobile-station. FIG. 2 depicts a wireless communication system 20 employing PSTD. Wireless communication system 20 comprises at least one base station 22 having two antenna elements 24-1 and 24-2, wherein antenna elements 24-1 and 24-2 are spaced far apart for achieving transmit diversity. Base station 22 receives a signal S for transmitting to mobile-station 26. Signal S is evenly power split into signals $s_1$ and $s_2$ and processed to produce signals $S^{24-1}$ and $S^{24-2}$, where $s_1 = s_2$. Specifically, signal $s_1$ is multiplied by Walsh code $w_k$ to produce $S^{24-1} = s_1 w_k$, where k represents a particular user or mobile-station. Signal $s_2$ is multiplied by Walsh code $w_k$ and a phase sweep frequency signal $e^{j2\pi f_s t}$ to produce $S^{24-2}$, i.e., $S^{24-2} = s_2 w_k e^{j2\pi f_s t} = s_1 w_k e^{j2\pi f_s t} = S^{24-1} e^{j2\pi f_s t}$, where $f_s$ is a phase sweep frequency and t is time. Signals $S^{24-1}$ and $S^{24-2}$ are transmitted at substantially equal power levels over antenna elements 24-1 and 24-2, respectively. Note that the phase sweep signal $e^{j2\pi f_s t}$ is being represented in complex baseband notation, i.e., $e^{j2\pi f_s t} = \cos(2\pi f_s t) + j \sin(2\pi f_s t)$. It should be understood that the phase sweep signal may also be applied at an intermediate frequency or a radio frequency.

Mobile-station 26 receives signal R comprising $\gamma_1 S^{24-1} + \gamma_2 S^{24-2}$. Simplifying the equation for R results in $$R = \gamma_1 S^{24-1} + \gamma_2 S^{24-1} e^{j2\pi f_s t} \quad \text{equation 3}$$

$$R = S^{24-1}\{\gamma_1 + \gamma_2 e^{j2\pi f_s t}\} \quad \text{equation 3a}$$

$$R = S^{24-1} \gamma_{eq} \quad \text{equation 3b}$$

where $\gamma_{eq}$ is an equivalent channel seen by mobile-station 26. Distortion factor coefficient $\gamma_{eq}$ can be estimated using pilot signals and used, along with equation 3b, to obtain estimates of signal $s_1$ and/or $s_2$.

In slow fading channel conditions, both transmit diversity techniques, i.e., STS and PSTD, improve performance (relative to when no transmit diversity technique is used) by making the received signal strength statistics associated with a slow fading channel at the receiver look like those associated with a fast fading channel. However, PSTD does not provide the same amount of overall performance improvement as STS. Additionally, in additive white gaussan noise (AWGN) conditions, PSTD can significantly degrade performance, whereas STS neither improves nor degrades performance. Accordingly, there exists a need for a transmission technique that provides the performance of STS and the backwards compatibility of PSTD without significantly degrading performance in AGWN conditions.

SUMMARY OF THE INVENTION

The present invention is a method and apparatus for transmission that provides the performance of space time spreading (STS) or orthogonal transmit diversity (OTD) and the backwards compatibility of phase sweep transmit diversity (PSTD) without significantly degrading performance in additive white guassan noise (AWGN) conditions using a transmission architecture that incorporates STS/OTD and a form of PSTD referred to herein as biased PSTD, which involves transmitting a signal and a frequency swept version of the same signal over diversity antennas at different power levels to reduce the depths of nulls normally seen in AWGN conditions when PSTD is utilized.

In one embodiment, a signal $s_1$ comprising a non-STS/OTD signal and a first STS/OTD signal belonging to an STS/OTD pair is split into two signals $s_1(a)$ and $s_1(b)$, wherein the power level of signal $s_1(a)$ is higher than the power level of signal $s_1(b)$. The signal $s_1(b)$ is phase swept using a phase sweep frequency signal. Thus, signal $s_1$ is processed in accordance with biased PSTD. The phase swept signal $s_1(b)$ is added to a signal $s_2$ to produce a summed signal, wherein signal $s_2$ comprises a second STS/OTD signal belonging to the STS/OTD pair. The summed signal and the signal $s_1(a)$ are amplified and transmitted over a pair of diversity antennas. The amount of gain applied to the summed signal and the signal $s_1(a)$ may be equal or unequal such that the amplified summed signal and the amplified signal $s_1(a)$ are at approximately equal power levels.

BRIEF DESCRIPTION OF THE DRAWINGS

The features, aspects, and advantages of the present invention will become better understood with regard to the following description, appended claims, and accompanying drawings where

DETAILED DESCRIPTION

Figure 1:
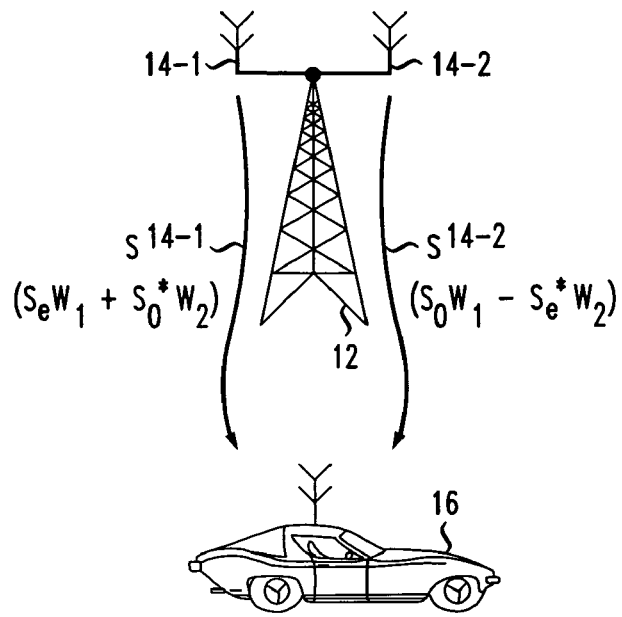
FIG. 1 depicts a wireless communication system employing space time spreading techniques in accordance with the prior art.
Figure 2:
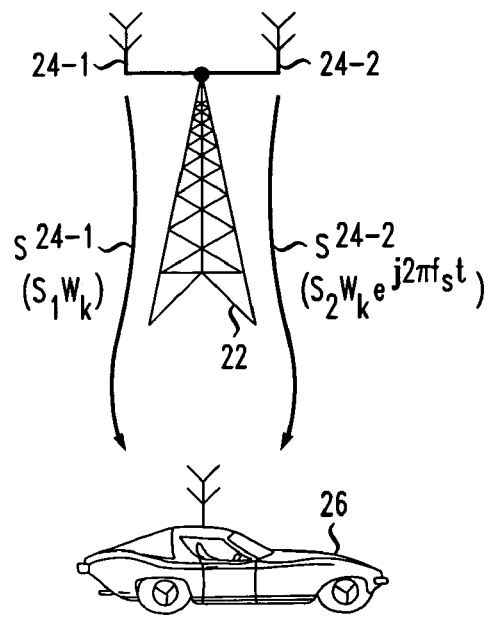
FIG. 2 depicts a wireless communication system employing phase sweep transmit diversity in accordance with the prior art.
Figure 3:
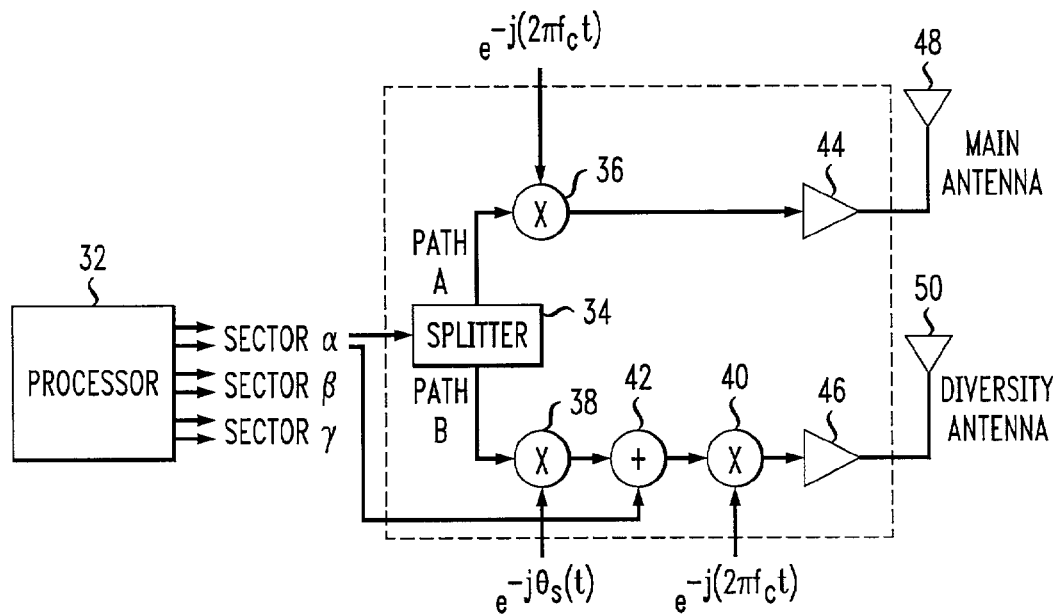
FIG. 3 depicts a base station employing code division multiple access (CDMA), a form of phase sweep transmit diversity (PSTD) referred to herein as biased PSTD, and space time spreading (STS) or orthogonal transmit diversity (OTD) in accordance with one embodiment of the present invention.

FIG. 3 depicts a base station 30 employing code division multiple access (CDMA), a form of phase sweep transmit diversity (PSTD) referred to herein as biased PSTD, and space time spreading (STS) or orthogonal transmit diversity (OTD) in accordance with the present invention. CDMA, PSTD, STS and OTD are well-known in the art.

Base station 30 provides wireless communication services to mobile-stations, not shown, in its associated geographical coverage area or cell, wherein the cell is divided into three sectors α, β, γ. Base station 30 includes a transmission architecture that incorporates STS or OTD and biased PSTD, as will be described herein.

Base station 30 comprises a processor 32, a splitter 34, multipliers 36, 38, 40, adder 42, amplifiers 44, 46, and a pair of diversity antennas 48, 50. Note that base station 30 also includes configurations of splitters, multipliers, adders, amplifiers and antennas for sectors β, γ that are identical to those for sector α. For simplicity sake, the configuration for sectors β, γ are not shown. Additionally, for discussion purposes, it is assumed that signals $S_k$ are intended for mobile-stations k located in sector α and, thus, the present invention will be described with reference to signals $S_k$ being processed for transmission over sector α.

Processor 32 includes software for processing signals $S_k$ in accordance with well-known CDMA and STS/OTD techniques, where STS/OTD indicates STS and/or OTD. The manner in which a particular signal $S_k$ is processed by processor 32 depends on whether mobile-station k is STS/OTD compatible, i.e., mobile-station capable of decoding signals processed using STS/OTD. Processor 32 may also include software for determining whether mobile-station k is STS/OTD compatible. If mobile-station k is not STS/OTD compatible, then signal $S_k$ is processed in accordance with CDMA techniques to produce signal $S_{k-1}$, which is also referred to herein as a non-STS/OTD signal $S_{k-1}$.

Note that, in another embodiment, processor 32 is operable to process signals $S_k$ in accordance with a multiple access technique other than CDMA, such as time or frequency division multiple access. In this embodiment, when mobile-station k is not STS/OTD compatible, then signal $S_k$ is processed in accordance with such other multiple access technique to produce the non-STS/OTD signal $S_{k-1}$.

If mobile-station k is STS/OTD compatible, then signal $S_k$ is processed in accordance with CDMA and STS/OTD. Specifically, if mobile-station k is STS compatible, then signal $S_k$ is processed using STS. Such process includes alternately dividing signal $S_k$ into signals $s_e$ and $s_o$, wherein signal $s_e$ comprises even data bits and signal $s_o$ comprises odd data bits. Signal $s_e$ is multiplied with Walsh code $w_1$ to produce signal $s_e w_1$, and a conjugate of signal $s_e$ is multiplied with Walsh code $w_2$ to produce $s_e^* w_2$. Signal $s_o$ is multiplied with Walsh code $w_1$ to produce $s_o w_1$, and a conjugate of signal $s_o$ is multiplied with Walsh code $w_2$ to produce signal $s_o^* w_2$. Signal $s_e w_1$ is added to signal $s_o^* w_2$ to produce signal $S_{k-2}(a)=s_e w_1 + s_o^* w_2$. Signal $s_e^* w_2$ is subtracted from signal $s_o w_1$ to produce signal $S_{k-2}(b)=s_o w_1 - s_e^* w_2$. Signals $S_{k-2}(a)$, $S_{k-2}(b)$ are also referred to herein as STS signals, and together signals $S_{k-2}(a)$, $S_{k-2}(b)$ collectively comprise an STS pair.

If mobile-station k is OTD compatible, then signal $S_k$ is processed using OTD. Orthogonal transmit diversity involves dividing signal $S_k$ into signals $s_e$ and $s_o$, and multiplying signals $s_e$ and $s_o$ using Walsh codes $w_1$, $w_2$ to produce signals $S_{k-3}(a)$, $S_{k-3}(b)$, i.e., $S_{k-3}(a)=s_e w_1$ and $S_{k-3}(b)=s_o w_2$, respectively. Signals $S_{k-3}(a)$, $S_{k-3}(b)$ are also referred to herein as OTD signals, and together signals $S_{k-3}(a)$, $S_{k-3}(b)$ collectively comprise an OTD pair.

For illustration purposes, the present invention will be described herein with reference to STS and signals $S_{k-2}(a)$, $S_{k-2}(b)$. It should be understood that the present invention is also applicable to OTD and signals $S_{k-3}(a)$, $S_{k-3}(b)$.

The output of processor 32 are signals $s_{\alpha-1}$, $s_{\alpha-2}$, where signal $s_{\alpha-1}$ comprises of signals $S_{k-1}$ and $S_{k-2}(a)$ and signal $s_{\alpha-2}$ comprises of signals $S_{k-2}(b)$, i.e., $s_{\alpha-1}=\Sigma S_{k-1}+\Sigma S_{k-2}(a)$ and $s_{\alpha-2}=\Sigma S_{k-2}(b)$. That is, signals intended for STS compatible mobile-stations are included in both output signals $s_{\alpha-1}$, $s_{\alpha-2}$ and signals intended for non-STS compatible mobile-stations are included in only signal $s_{\alpha-1}$. Alternately, signal $s_{\alpha-1}$ comprises of signals $S_{k-1}$ and $S_{k-2}(b)$ and signal $s_{\alpha-2}$ comprises of signals $S_{k-2}(a)$.

Signal $s^{\alpha-1}$ is split by splitter 34 into signals $s_{\alpha-1}(a)$, $s_{\alpha-1}(b)$ and processed along paths A and B, respectively, by multipliers 36, 38, 40, adder 42 and amplifiers 44, 46 in accordance with bias PSTD techniques. Basically, biased PSTD involves transmitting a signal and a frequency swept version of the same signal over diversity antennas at different power levels. Advantageously, biased PSTD is backwards compatible from the perspective of mobile-stations and does not degrade performance as much as PSTD in additive white gaussan noise (AWGN) conditions.

In one embodiment, signal $s_{\alpha-1}$ is unevenly power split by splitter 34 such that the power level of signal $s_{\alpha-1}(a)$ is higher than the power level of signal $s_{\alpha-1}(b)$. For example, signal $s_{\alpha-1}$ is power split such that signal $s_{\alpha-1}(a)$ gets ⅝ of signal $s_{\alpha-1}$'s power and signal $s_{\alpha-1}(b)$ gets ⅜ of signal $s_{\alpha-1}$'s power, i.e., $s_{\alpha-1}(a)=mt;epmrl;\sqrt{5/8}rlxmx$ $(s_{\alpha-1})$ and $s_{\alpha-1}(b)=mt;epmrl;\sqrt{3/8}rlxmx(s_{\alpha-1})$. In another example, signal $s_{\alpha-1}$ is power split such that signal $s_{\alpha-1}(a)$ gets ⅔ of signal $s_{\alpha-1}$'s power and signal $s_{\alpha-1}(b)$ gets ⅓ of signal $s_{\alpha-1}$'s power. In another embodiment, signal $s_{\alpha-1}$ is evenly power split by splitter 34. Note that signal $s_{\alpha-1}(a)$ is identical to signal $s_{\alpha-1}(b)$ in terms of data. Signal $s_{\alpha-1}(a)$ and carrier signal $e^{-j2\pi f_c t}$ are provided as inputs into multiplier 36 to produce signal $S_{36}$, where $S_{36}=s_{\alpha-1}(a)e^{-j2\pi f_c t}$, $e^{-j2\pi f_c t}=\cos(2\pi f_c t)+j\sin(2\pi f_c t)$, $f_c$ represents a carrier frequency and t represents time.

Signal $s_{\alpha-1}(b)$ and phase sweep frequency signal $e^{-j\Theta_s(t)}$ are provided as inputs into multiplier 38 where signal $s_{\alpha-1}(b)$ is frequency phase swept with signal $e^{-j\Theta_s(t)}$ to produce signal $S_{38}=s_{\alpha-1}(b)e^{-j\Theta_s(t)}$, wherein $\Theta_s=2\pi f_s t$, $e^{-j\Theta_s(t)}=\cos(2\pi f_s t)+j\sin(2\pi f_s t)$ and $f_s$ represents a phase sweep frequency.

Signal $S_{38}$ is added to signal $s_{\alpha-2}$ by adder 42 to produce signal $S_{42}=s_{\alpha-1}(b)e^{-j\Theta_s(t)}+s_{\alpha-2}$. Signal $S_{42}$ and carrier signal $e^{-j2\pi f_c t}$ are provided as inputs into multiplier 40 to produce signal $S_{40}$, where $S_{40}=(s_{\alpha-1}(b)e^{-j\Theta_s(t)}+s_{\alpha-2})e^{-j2\pi f_c t}$.

Signals $S_{36}$, $S_{40}$ are amplified by amplifiers 44, 46 to produce signals $S_{44}$ and $S_{46}$ for transmission over antennas 48, 50, respectively, where signal $S_{44}=A_{44}s_{\alpha-1}(a)e^{-j2\pi f_c t}$, $S_{46}=A_{46}(s_{\alpha-1}(b)e^{-j\Theta_s(t)}+s_{\alpha-2})e^{-j2\pi f_c t}$, $A_{44}$ represents the amount of gain associated with amplifier 44 and $A_{46}$ represents the amount of gain associated with amplifier 46.

In one embodiment, the amounts of gain $A_{44}$, $A_{46}$ are equal. In this embodiment, signal $s_{\alpha-1}$ is split by splitter 34 such that the power level of signal $s_{\alpha-1}(a)$ is higher than the power level of signal $s_{\alpha-1}(b)$ so that differences in power level between signals $S_{44}$ and $S_{46}$ are not as large compared to an even power split of signal $s_{\alpha-1}$.

In another embodiment, the amounts of gain $A_{44}$, $A_{46}$ are different and related to how splitter 34 power splits signal $s_{\alpha-1}$. Specifically, the amount of gain $A_{44}$, $A_{46}$ applied to signals $S_{36}$, $S_{40}$ should be an amount that would cause the power levels of signals $S_{44}$ and $S_{46}$ to be approximately equal. For purposes of this application, power levels are "approximately equal" when the power levels are within 10% of each other. For example, suppose the power levels of both signals $s_{\alpha-1}$, $s_{\alpha-2}$ are x and splitter 34 splits signal $s_{\alpha-1}$ such that the power levels of signals $s_{\alpha-1}(a)$, $s_{\alpha-1}(b)$ are 7/8x and 1/8x, respectively. After signal signals $s_{\alpha-2}$ is added to signal $S_{38}$ by adder 42, the power level of the resultant signal $S_{42}$ is 9/8x. In this example, the amount of gains $A_{44}$, $A_{46}$ might be 8/7 and 8/9, respectively.

In the case where signal $s_{\alpha-1}$ and/or signals $S_{36}$, $S_{40}$ are not biased or unevenly split or amplified, STS performance will degrade because signal $S_{44}$ will be transmitted at approximately ⅓ of the power at which signal $S_{46}$ will be transmitted. Advantageously, biasing or unevenly splitting signal $s_{\alpha-1}$ and/or biasing or unevenly amplifying signals $S_{36}$, $S_{40}$ mitigates this degradation to STS performance relative to the case where neither signal $s_{\alpha-1}$ nor signals $S_{36}$, $S_{40}$ are biased or unevenly split or amplified.

Figure 5:
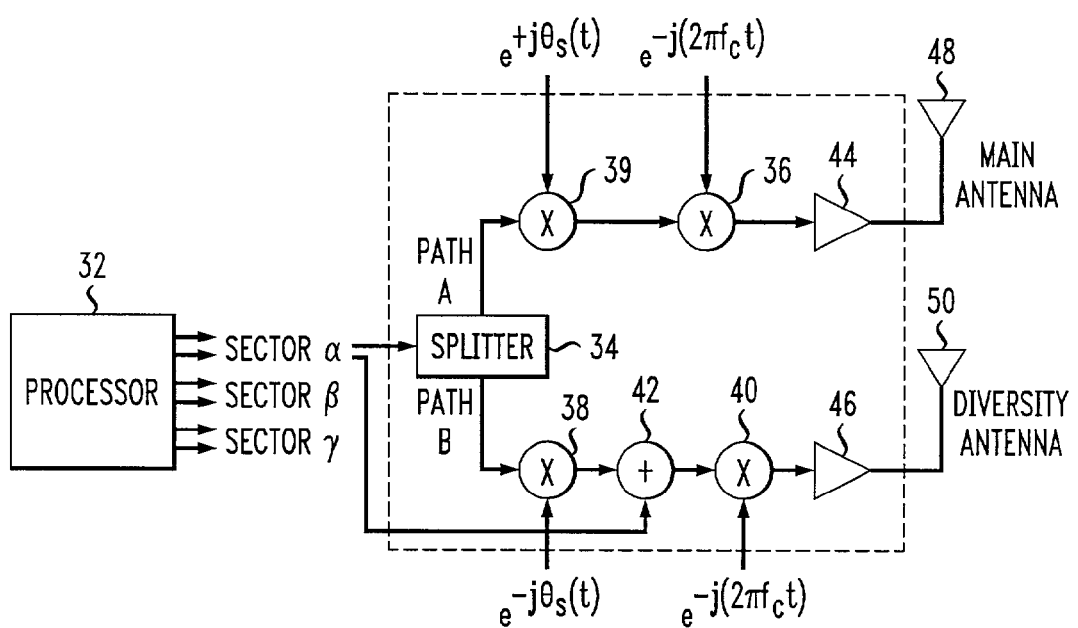
FIG. 5 depicts a base station employing CDMA, biased PSTD, STS or OTD, and split shift PSTD in accordance with another embodiment of the present invention.

FIG. 5 depicts a base station 70 employing CDMA, biased PSTD, STS/OTD and split shift PSTD in accordance an embodiment of the present invention. In this embodiment, , a form of PSTD referred to herein as split shift PSTD in also utilized. Spilt shift PSTD involves shifting both signals split from a single signal using phase sweep frequency signals that sweeps both signals in opposite direction. As shown in FIG. 5, signals $s_{\alpha-1}(a)$, is phase swept by multiplier 39 using phase sweep frequency signals $e^{j\Theta_s(t)}$. Although this embodiment depicts phase sweep frequency signal $e^{j\Theta_s(t)}$ equal and opposite to phase sweep frequency signals $e^{-j\Theta_s(t)}$, it should be understood that the phase sweep frequency signal used to phase sweep signals $s_{\alpha-1}(a)$ need not be equal in magnitude. In another embodiment, signal $s_{\alpha-1}(a)$ is phase swept using a phase sweep frequency signal that results in phase swept signal $s_{\alpha-1}(a)$ with a desired or other phase difference to phase swept signal $s_{\alpha-1}(b)$. Note that that the phase sweep frequency signal used to phase sweep signals $s_{\alpha-1}(a)$, $s_{\alpha-1}(b)$ may be phase shifting at an identical or different rate from each other, may be phase shifting at fixed and/or varying rates, or may be phase shifting in the same or opposite direction.

Figure 4:
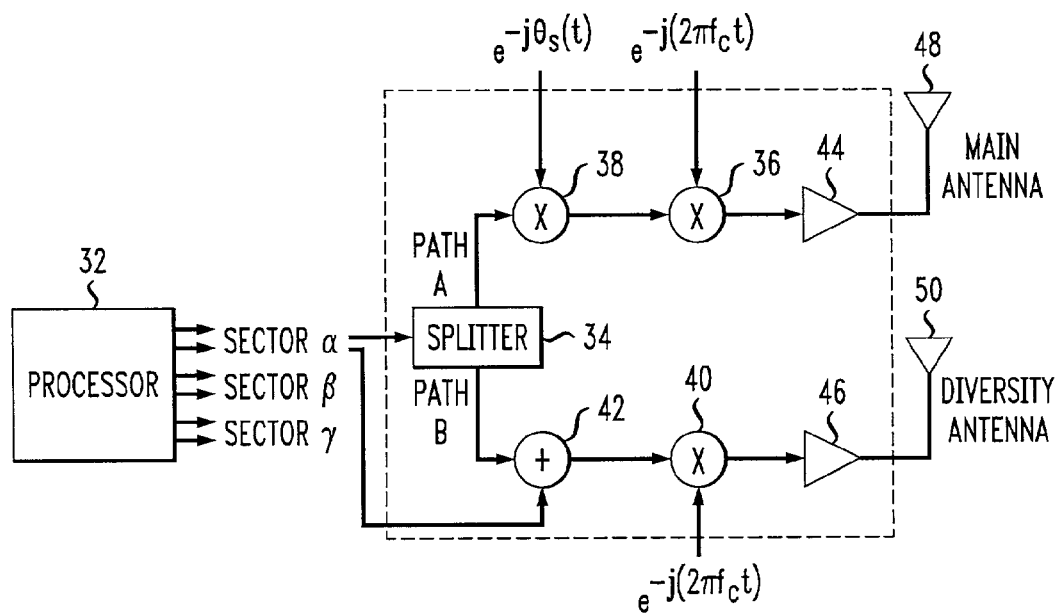
FIG. 4 depicts a base station employing CDMA, biased PSTD, and STS or OTD in accordance with another embodiment of the present invention.

Although the present invention has been described in considerable detail with reference to certain embodiments, other versions are possible. For example, phase sweeping may be performed along path A instead of path B, i.e., signal $s_{\alpha-1}(a)$ is phase swept with signal $e^{-j\Theta_s(t)}$. FIG. 4 depicts a base station 60 in which phase sweeping is performed along path A instead of path B. Therefore, the spirit and scope of the present invention should not be limited to the description of the embodiments contained herein.

We claim:

1. A method of signal transmission comprising the steps of:
    splitting a signal $s_1$ into signals $s_1(a)$ and $s_1(b)$, wherein signal $s_1$ comprises a first STS/OTD signal belonging to an STS/OTD pair;
    phase sweeping the signal $s_1(b)$ using a first phase sweep frequency signal to produce a phase swept signal $s_1(b)$; and
    adding the phase swept signal $s_1(b)$ to a signal $s_2$ to produce a summed signal $s_3$, wherein the signal $s_2$ comprises a second STS/OTD signal belonging to the STS/OTD pair.

2. The method of claim 1, wherein the signal $s_1$ is split unevenly such that the signal $s_1(a)$ has an associated power level greater than a power level associated with the signal $s_1(b)$.

3. The method of claim 1 comprising the additional steps of:
    amplifying the signal $s_1(a)$ to produce an amplified signal $s_1(a)$; and
    amplifying the signal $s_3$ to produce an amplified signal $s_3$.

4. The method of claim 3, wherein power levels associated with the amplified signal $s_1(a)$ and the amplified signal $s_3$ are approximately equal.

5. The method of claim 3, wherein the signals $s_1(a)$ and $s_3$ are amplified an equal amount.

6. The method of claim 1 comprising the additional steps of:
    transmitting the signal $s_1(a)$ over a first antenna belonging to a pair of diversity antennas; and transmitting the signal $s_3$ over a second antenna belonging to the pair of diversity antennas.

7. The method of claim 1 comprising the additional steps of:
processing a signal S using space time spreading techniques to produce the signals $s_1$ and $s_2$.

8. The method of claim 1, wherein the signal $s_1$ comprises a non-STS/OTD signal.

9. The method of claim 1 comprising the additional steps of:
phase sweeping the signal $s_1(a)$ using a second phase sweep frequency signal to produce a phase swept signal $s_1(a)$ with a different phase from the phase swept signal $s_1(b)$.

10. A method of signal transmission comprising the steps of:
splitting a signal $s_1$ into signals $s_1(a)$ and $s_1(b)$, wherein signal $s_1$ comprises a first STS/OTD signal belonging to an STS/OTD pair;
phase sweeping the signal $s_1(a)$ using a first phase sweep frequency signal to produce a phase swept signal $s_1(a)$; and
adding the signal $s_1(b)$ to a signal $s_2$ to produce a summed signal $s_3$, wherein the signal $s_2$ comprises a second STS/OTD signal belonging to the STS/OTD pair.

11. The method of claim 10, wherein the signal $s_1$ is split unevenly such that the signal $s_1(a)$ has an associated power level greater than a power level associated with the signal $s_1(b)$.

12. The method of claim 10 comprising the additional steps of:
amplifying the phase swept signal $s_1(a)$ to produce an amplified phase swept signal $s_1(a)$; and
amplifying the signal $s_3$ to produce an amplified signal $s_3$.

13. The method of claim 12, wherein power levels associated with the amplified phase swept signal $s_1(a)$ and the amplified signal $s_3$ are approximately equal.

14. The method of claim 12, wherein the phase swept signal $s_1(a)$ and the signal $s_3$ are amplified an equal amount.

15. The method of claim 10 comprising the additional steps of:
transmitting the phase swept signal $s_1(a)$ over a first antenna belonging to a pair of diversity antennas; and
transmitting the signal $s_3$ over a second antenna belonging to the pair of diversity antennas.

16. The method of claim 10 comprising the additional steps of:
processing a signal S using space time spreading techniques to produce the signals $s_1$ and $s_2$.

17. The method of claim 10, wherein the signal $s_1$ comprises a non-STS/OTD signal.

18. The method of claim 10 comprising the additional steps of:
phase sweeping the signal $s_1(b)$ using a second phase sweep frequency signal to produce a phase swept signal $s_1(b)$ with a different phase from the phase swept signal $s_1(a)$.

19. A base station comprising:
a splitter for splitting a signal $s_1$ into signals $s_1(a)$ and $s_1(b)$, wherein signal $s_1$ comprises a first STS/OTD signal belonging to an STSOTD pair;
a multiplier for phase sweeping the signal $s_1(b)$ using a first phase sweep frequency signal to produce a phase swept signal $s_1(b)$; and
an adder for adding the phase swept signal $s_1(b)$ to a signal $s_2$ to produce a summed signal $s_3$, wherein the signal $s_2$ comprises a second STS/OTD signal belonging to the STS/OTD pair.

20. The base station of claim 19, wherein the splitter unevenly splits the signal $s_1$ such that the signal $s_1(a)$ has an associated power level greater than a power level associated with the signal $s_1(b)$.

21. The base station of claim 19 further comprising:
a first amplifier for amplifying the signal $s_1(a)$ to produce an amplified signal $s_1(a)$; and
a second amplifier for amplifying the signal $s_3$ to produce an amplified signal $s_3$.

22. The base station of claim 21, wherein the first and second amplifiers amplify the signals $s_1(a)$ and $s_3$ such that power levels associated with the amplified signals $s_1(a)$ and $s_3$ are approximately equal.

23. The base station of claim 21, wherein the first and second amplifiers amplify the signals $s_1(a)$ and $s_3$ an equal amount.

24. The base station of claim 19 further comprising:
a pair of diversity antennas having a first and a second antenna;
a first transmitter for transmitting the signal $s_1(a)$ over the first antenna; and
a second transmitter for transmitting the signal $s_3$ over the second antenna.

25. The base station of claim 19 further comprising:
a processor for processing a signal S using STS/OTD techniques to produce the signals $s_1$ and $s_2$.

26. The base station of claim 19, wherein the signal $s_1$ comprises a non-STS/OTD signal.

27. The base station of claim 19 further comprising:
a multiplier for phase sweeping the signal $s_1(a)$ using a second phase sweep frequency signal to produce a phase swept signal $s_1(a)$ with a different phase from the phase swept signal $s_1(b)$.

28. A base station comprising:
a splitter for splitting a signal $s_1$ into signals $s_1(a)$ and $s_1(b)$, wherein signal $s_1$ comprises a first STS/OTD signal belonging to an STS/OTD pair;
a multiplier for phase sweeping the signal $s_1(a)$ using a first phase sweep frequency signal to produce a phase swept signal $s_1(a)$; and
an adder for adding the signal $s_1(b)$ to a signal $s_2$ to produce a summed signal $s_3$, wherein the signal $s_2$ comprises a second STS/OTD signal belonging to the STS/OTD pair.

29. The base station of claim 28, wherein the splitter unevenly splits the signal $s_1$ such that the signal $s_1(a)$ has an associated power level greater than a power level associated with the signal $s_1(b)$.

30. The base station of claim 28 further comprising:
a first amplifier for amplifying the phase swept signal $s_1(a)$ to produce an amplified phase swept signal $s_1(a)$; and
a second amplifier for amplifying the signal $s_3$ to produce an amplified signal $s_3$.

31. The base station of claim 30, wherein the first and second amplifiers amplify the signals $s_1(a)$ and $s_3$ such that power levels associated with the amplified phase swept signal $s_1(a)$ and amplified signal $s_3$ are approximately equal.

32. The base station of claim 30, wherein the first and second amplifiers amplify the signals $s_1(a)$ and $s_3$ an equal amount.

33. The base station of claim 28 further comprising:
a pair of diversity antennas having a first and a second antenna;
a first transmitter for transmitting the phase swept signal $s_1(a)$ over the first antenna; and
a second transmitter for transmitting the signal $s_3$ over the second antenna.

34. The base station of claim 28 further comprising:
a processor for processing a signal S using space time spreading techniques to produce the signals $s_1$ and $s_2$.

35. The base station of claim 28, wherein the signal $s_1$ comprises a non-STS/OTD signal.

36. The base station of claim 28 further comprising:
a multiplier for phase sweeping the signal $s_1(b)$ using a second phase sweep frequency signal to produce a phase swept signal $s_1(b)$ with a different phase from the phase swept signal $s_1(a)$.

* * * * *